(12) United States Patent
Gimeno et al.

(10) Patent No.: US 11,459,273 B2
(45) Date of Patent: Oct. 4, 2022

(54) THREE COMPONENT COMPOSITION FOR THE MANUFACTURE OF PRIMER LAYER OR SCRATCH COATING FOR FLOORING

(71) Applicant: SIKA TECHNOLOGY AG, Baar (CH)

(72) Inventors: Patricia Gimeno, Stuttgart (DE); Carola Kaddatz, Oppenweiler (DE); Jochen Grötzinger, Schwäbisch Gmünd (DE)

(73) Assignee: SIKA TECHNOLOGY AG, Baar (CH)

( * ) Notice: Subject to any disclaimer, the term of this patent is extended or adjusted under 35 U.S.C. 154(b) by 233 days.

(21) Appl. No.: 16/634,513

(22) PCT Filed: Aug. 22, 2018

(86) PCT No.: PCT/EP2018/072689
§ 371 (c)(1),
(2) Date: Jan. 27, 2020

(87) PCT Pub. No.: WO2019/038340
PCT Pub. Date: Feb. 28, 2019

(65) Prior Publication Data
US 2021/0078904 A1    Mar. 18, 2021

(30) Foreign Application Priority Data

Aug. 23, 2017 (EP) ..................... 17187582

(51) Int. Cl.
| | | |
|---|---|---|
| *C04B 24/28* | (2006.01) | |
| *C04B 22/06* | (2006.01) | |
| *C04B 28/00* | (2006.01) | |
| *C08G 18/30* | (2006.01) | |
| *C08G 18/76* | (2006.01) | |
| *C08K 5/18* | (2006.01) | |
| *C08G 18/18* | (2006.01) | |
| *C09D 175/04* | (2006.01) | |
| *C04B 111/00* | (2006.01) | |
| *C08K 3/22* | (2006.01) | |
| *C08G 18/36* | (2006.01) | |
| *C08G 18/10* | (2006.01) | |

(52) U.S. Cl.
CPC .......... *C04B 24/282* (2013.01); *C04B 22/064* (2013.01); *C04B 28/00* (2013.01); *C08G 18/1825* (2013.01); *C08G 18/302* (2013.01); *C08G 18/36* (2013.01); *C08G 18/7664* (2013.01); *C08K 3/22* (2013.01); *C08K 5/18* (2013.01); *C09D 175/04* (2013.01); *C04B 2111/00491* (2013.01); *C08G 18/10* (2013.01); *C08G 2150/00* (2013.01); *C08K 2003/2206* (2013.01)

(58) Field of Classification Search
CPC ...... C08G 18/1825; C04B 2111/00491; C04B 22/064
See application file for complete search history.

(56) References Cited

U.S. PATENT DOCUMENTS

| | | | | |
|---|---|---|---|---|
| 3,332,893 A | * | 7/1967 | Birum | .................. C08G 18/388 521/160 |
| 2016/0075600 A1 | * | 3/2016 | Gimeno | .................. C04B 28/02 524/650 |

FOREIGN PATENT DOCUMENTS

| | | | | |
|---|---|---|---|---|
| AU | 426 554 B2 | 7/1972 | | |
| GB | 1 483 270 A | 8/1977 | | |
| JP | 11079820 A | * | 3/1999 | ........... C04B 24/282 |
| JP | 4258885 B2 | * | 4/2009 | ........... C04B 24/282 |
| WO | WO-2015173214 A1 | * | 11/2015 | ......... C08G 18/7664 |

OTHER PUBLICATIONS

Machine Translation of JP4258885B2. Apr. 20, 2009. (Year: 2009).*
Partial Written Translation of JP4258885B2. Apr. 20, 2009. (Year: 2009).*
FerroGard 901 MSDS. Sika. Feb. 26, 2009. (Year: 2009).*
Written translation of Paragraphs 50-52 of JP4258885B2. Apr. 20, 2009. (Year: 2009).*
Machine Translation of JPH11-079820A. Mar. 23, 1999. (Year: 1999).*
Sep. 19, 2018 International Search Report issued in International Patent Application No. PCT/EP2018/072689.
Sep. 19, 2018 Written Opinion of the International Searching Authority issued in International Patent Application No. PCT/EP2018/072689.

* cited by examiner

*Primary Examiner* — Stephen E Rieth
(74) *Attorney, Agent, or Firm* — Oliff PLC

(57) ABSTRACT

A three component composition consisting of a polyol component (A) including at least two polyols, one with high, one with low molecular weight and water, a polyisocyanate component (B) including a methylene diphenyl diisocyanate (MDI) product with an average NCO functionality of at least 2.5, or a methylene diphenyl diisocyanate (MDI) product with an average NCO functionality of at least 2 and at least one further polyol with an amount of between 1% and 30% based on the weight of the polyisocyanate component (B), wherein the MDI product and the polyol have reacted at least partially, and a powder component (C) including at least one hydraulic binder, preferably cement and/or calcined paper sludge, preferably a calcium compound selected from calcium hydroxide and/or calcium oxide, and optionally one or more aggregates.

13 Claims, No Drawings

THREE COMPONENT COMPOSITION FOR THE MANUFACTURE OF PRIMER LAYER OR SCRATCH COATING FOR FLOORING

TECHNICAL FIELD

The invention relates to a three component composition for the manufacture of primer layer or scratch coating for flooring, a method for the manufacture of such layers with the three component composition and the use of a three component composition for the manufacture of primer layer or scratch coating for flooring.

BACKGROUND OF THE INVENTION

When doing floors, especially industrial floors, on concrete surfaces, usually a waterproofing layer is applied to safeguard adhesion and proper performance of the flooring compositions on the substrate. These layers are also called primer layer or scratch coat and are applied in a thickness of 0.4-0.8 mm in case of primer layer or in a thickness of 1-2 mm in case of scratch coats.

In the state of the art, such products are typically based on one-component polyurethane compositions, epoxy-based compositions or acrylate-based compositions. However, the epoxy-based compositions or acrylate-based compositions have the disadvantage that they cannot be used on freshly cured concrete (green concrete) substrates. The one-component polyurethane systems have the disadvantage of blister formation when applied to freshly cured concrete substrates. Another drawback of many of the products of the state of the art is the fact that the applicator has to wait 12-16 hours after the application of the primer layer or scratch coat before being able to apply the base/wear coat.

There is a strong interest in the field for primer layer or scratch coat that displays an open time at 20-25° C. of between 15 min and 5 hours and should be usable in a temperature range from 5-35° C. without affecting mechanical and workability characteristics. Mentioned open time allows the applicator to do all the works with one jobsite visit, in one day respectively.

SUMMARY OF THE INVENTION

Therefore, the object of the present invention is to provide primer layer or scratch coat which exhibit an open time at 20-25° C. of between 15 min and 5 hours and which are usable in a temperature range from 5-35° C. with good mechanical and workability properties. Furthermore, blister formation due to unwanted side reactions is to be avoided as much as possible.

Surprisingly, this object could be achieved by using a three component composition including a polyol component containing at least two polyols, one with high and one with low molecular weight, and water, a methylene diphenyl diisocyanate (MDI) product component containing either MDI with an average functionality of at least 2.5, or MDI with an average functionality of 2 which has been partially pre-polymerised with at least one further polyol, and a powder component. Further, the composition contains 2-(Dimethylamino)ethanol in a specific amount.

Moreover, further improved results can be achieved when the composition contains in addition a specific tertiary amine.

Accordingly, the present invention relates to a three component composition consisting of a polyol component (A) comprising a)—at least one polyol P1a with an average molecular weight of 800 to 30'000 g/mol, preferably 850 to 20'000 g/mol, more preferably 900 to 10'000 g/mol, whereby the polyol P1a is:

a polyhydroxy-functional fat and/or a polyhydroxy-functional oil or a polyol obtained by chemical modification of natural fats and/or natural oils, and at least one polyol P1b with an average molecular weight of 48 to 800 g/mol, preferably 60 to 600 g/mol, more preferably 60 to 400 g/mol, most preferably 60 to 300 g/mol, and water, and b) a polyisocyanate component (B) comprising a methylene diphenyl diisocyanate (MDI) product with an average NCO functionality of at least 2.5, or a methylene diphenyl diisocyanate (MDI) product with an average NCO functionality of at least 2 and at least one polyol P2 with an amount of between 1 and 30%, preferably between 5 and 25%, more preferably between 10 and 20% by weight, based on the weight of said polyisocyanate component (B), wherein said MDI product and said polyol P2 have reacted at least partially, and c) a powder component (C) comprising at least one hydraulic binder, preferably cement and/or calcined paper sludge.

The composition contains 2-(Dimethylamino)ethanol, whereby the molar ratio of the 2-(Dimethylamino)ethanol to the OH-groups of the polyol P1a is between 0.0008 and 0.013, preferably 0.0042 and 0.013, most preferably 0.0084 and 0.011.

The weight ratio of components (A+B) to component (C) ((A+B)/(C)) is in the range of 2:1.5 to 2:3.5, wherein components (A+B) represents the combined weight of component (A) and component (B).

The inventive three component composition can be used as primer layer or scratch coat for flooring, especially industrial flooring, applications. The inventive three component composition can provide a waterproofing layer on substrates, especially concrete substrates, that enables good adhesion and proper performance of the flooring systems applied onto them.

The inventive three component composition exhibits over a broad temperature range from 5-35° C. good characteristics as to workability and open time. Moreover, blister formation can be avoided, which may positively affect the surface appearance and the applied compositions are accessible/walkable after a short period of time. A further benefit is the moisture tolerance within the temperature range of 5-35° C.

The system of the invention is particularly suited as a primer layer or scratch coat for polyurethane cementitious hybrid self-levelling screed in combination with heavy duty demands for flooring, especially industrial flooring.

DETAILED DESCRIPTION OF THE INVENTION

Substance names beginning with "poly", such as e.g. polyol or polyisocyanate, designate substances which formally contain, per molecule, two or more of the functional groups occurring in their names.

The term "open time" is understood to mean the duration of processability when the components are mixed with each other. The end of the open time is usually associated with viscosity increase of the composition such that processing of the composition is no longer possible.

The average molecular weight is understood to mean the number average molecular weight, as determined using conventional methods, preferably by gel permeation-chromatography (GPC) using polystyrene as standard (Mn), styrene-divinylbenzene gel with porosity of 100 Angstrom, 1000 Angstrom and 10000 Angstrom as the column and tetrahydrofuran as a solvent, at 35° C.

The term average functionality in this document describes the average number of functional groups on a given molecule. For, e.g., a polyisocyanate, a functionality of 2 would describe a polyisocyanate molecule with in average 2 isocyanate groups per molecule.

The composition of the invention consists of three individual components, which are stored separately in order to avoid spontaneous reaction, and are combined when a polyurethane cementitious hybrid flooring or coating is to be prepared. The components may be assembled together as a package. The three components are a polyol component (A), a polyisocyanate component (B) and a powder component (C) which are also simply referred to as component (A), component (B), and component (C), respectively, which are described in the following.

Polyol Component (A)

The polyol component (A) comprises at least one polyol P1a with an average molecular weight of 800 to 30'000 g/mol, preferably 850 to 20'000 g/mol, more preferably 900 to 10'000 g/mol, whereby the polyol P1a is a polyhydroxy-functional fat and/or a polyhydroxy-functional oil, preferably natural fats and/or oils, most preferred castor oil, or a polyol obtained by chemical modification of natural fats and/or natural oils, so-called oleochemical polyols.

Castor oil or a chemical modification thereof, especially Castor oil, is particularly preferred.

Examples of chemically modified natural fats and/or oils are polyols obtained from epoxypolyesters or epoxypolyethers obtained, for example, by epoxidation of unsaturated oils, by subsequent ring opening with carboxylic acids or alcohols, polyols obtained by hydroformylation and hydrogenation of unsaturated oils, or polyols which are obtained from natural fats and/or oils by degradation processes, such as alcoholysis or ozonolysis, and subsequent chemical linkage, for example by transesterification or dimerization, of the degradation products thus obtained or derivatives thereof. Also suitable are polyols obtained by polyoxyalkylation of natural oils, such as castor oil, for example available under the trade name Lupranol Balance® by Elastogran GmbH, Germany. Suitable degradation products of natural fats and/or oils are in particular fatty acids and fatty alcohols and fatty acid esters, in particular the methyl esters (FAME), which can be derivatized, for example, by hydroformylation and hydrogenation to give hydroxy-fatty acid esters.

The polyols P1a mentioned above usually have a relatively high average molecular weight of between 800 and 30'000 g/mol, preferably between 850 and 20'000 g/mol, more preferably between 900 and 10'000 g/mol, and preferably an average OH functionality in the range from 1.6 to 3.

Examples of suitable polyols P1 b are low molecular weight di- or polyhydric alcohols, with a molecular weight of 48 to 800 g/mol. Examples thereof are C2 to C12 alkyl diols, such as 1,2-ethanediol ((mono)ethylene glycol), 1,2- and 1,3-propanediol, neopentylglycol, diethylene glycol, triethylene glycol, the isomeric dipropylene glycols and tripropylene glycols, the isomeric butanediols (such as 1,2-, 1,3-, and 1,4-butandediol), pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols, such as xylitol, sorbitol or mannitol, sugars, such as sucrose, other alcohols having a higher functionality, low molecular weight alkoxylation products of the abovementioned di- and polyhydric alcohols, and mixtures thereof.

The polyols P1 b mentioned above usually have a relatively low molecular weight, for instance, an average molecular weight of from 48 to 800 g/mol, preferably 60 to 600 g/mol, more preferably 60 to 400 g/mol, most preferably 60 to 300 g/mol.

It is advantageous if the polyols P1 b have an average OH functionality of 1.6 to 6, preferably 2 to 5, more preferably 2 to 4.

Preferably, the polyol P1 b is selected from C2 to C12 alkyl diols, glycerol, sugars, or oligomers thereof. Especially preferred polyols P1b are ethylene glycol or triethylene glycol.

In a preferred embodiment component (A) comprises said polyol P1a with an amount of 20 to 75%, preferably 25 to 70%, more preferably 30 to 60%, most preferably 35 to 50% by weight, based on the total weight of component (A), and said polyol P1b with an amount of 1 to 25%, preferably 2 to 20%, more preferably 3 to 15%, most preferably 3 to 10% by weight, based on the total weight of component (A).

Component (A) furthermore comprises water, in a preferred embodiment with an amount of 20 to 40%, preferably 22 to 35%, more preferably 24 to 30% by weight, based on the total weight of component (A), and/or wherein the weight ratio of water to polyol P1b is in the range of 0.8 to 40, preferably 1.6 to 20, more preferably 2 to 6, and/or wherein the weight ratio of water in component (A) to hydraulic binder in component (C) is in the range of 0.1 to 0.7. Preferably all those conditions are met simultaneously.

Apart from the one or more polyols and water, component (A) may contain further additives. Such additives are commonly used, if desired, and typically known to the persons skilled in the art of polyurethanes. Examples of optional additives are plasticizers, pigments, adhesion promoters, such as silanes, e.g. epoxysilanes, (meth)acrylatosilanes and alkylsilanes, stabilizers against heat, light, and UV radiation, thixotropic agents, flow improving additives, flame retardants, surface active agents such as defoamers, wetting agents, flow control agents, deaerating agents, biocides and emulsifiers.

Preferably used optional additives for component (A) are one or more plasticizers, such as benzoates (benzoate esters), benzyl phthalates, e.g. Santicizer®160 (benzylbutyl phthalate), citric acid esters, e.g. Citrofol®B II (acetyltributyl citrate), ethoxylated castor oil, stearates (perferably ethylene oxide modified), propyleneglycol laurates, and diisopropylbenzene, e.g. Benzoflex®9-88.

In a preferred embodiment, component (A) comprises 10 to 30%, preferably 15 to 25% by weight of a plasticizer, based on the total weight of component (A).

Other suitable additives include pigments, such as inorganic and organic pigments, e.g. Bayferrox® and Heucosin®, defoamers, such as solvent silicon free and polyorganosiloxane, e.g. Tego® Airex and Efka®, and emulsifiers such as calcium hydroxide and calcium oxide.

While component (A) can be prepared without an emulsifier, the addition of an emulsifier may be suitable since the emulsifier increases stability of component (A) when the emulsion is prepared. A suitable emulsifier is calcium hydroxide. The content of the emulsifier, preferably calcium hydroxide, in component (A) may be up to 0.5% by weight, preferably in the range of 0.01 to 0.5% by weight based on the total weight of component (A).

Polyisocyanate Component (B)

The polyisocyanate component (B) comprises a methylene diphenyl diisocyanate (MDI) product with an average NCO functionality of at least 2.5, or a methylene diphenyl diisocyanate (MDI) product with an average NCO functionality of at least 2 and at least one polyol P2 with an amount of between 1% and 30%, preferably between 5% and 25%, more preferably between 10% and 20%, based on the weight of said polyisocyanate component (B), wherein said MDI product and said polyol have reacted at least partially.

In the following methylene diphenyl diisocyanate is abbreviated as "MDI" as usual. A plurality of different MDI product grades is available. MDI products can be classified into monomeric MDI (MMDI) also referred to as pure MDI and polymeric MDI (PMDI) also referred to as technical MDI. Such MDI products are commercially available. The MDI product is preferably monomeric MDI or polymeric MDI or a mixture of monomeric MDI and polymeric MDI.

There exists three isomers of MDI, namely 4,4'-methylene diphenyl diisocyanate (4,4'-MDI), 2,4'-methylene diphenyl diisocyanate (2,4'-MDI), and 2,2'-methylene diphenyl diisocyanate (2,2'-MDI).

It should be mentioned that polymeric MDI is a common designation for MDI products including a mixture of MDI isomers or a single isomer and oligomeric species as outlined above and explained in more detail below. The term "polymeric" in polymeric MDI does not necessarily mean that polymeric MDI contains common polymers of MDI.

Monomeric MDI or pure MDI is a MDI product of a single MDI isomer or isomer mixtures of two or three MDI isomers. The isomeric ratio of MDI isomers can vary in wide ranges. For instance, 4,4'-MDI is a colorless to yellowish solid having a melting point of 39.5° C. Commercial monomeric MDI is often a mixture of 4,4'-MDI, 2,4'-MDI and typically very low levels of 2,2'-MDI.

Polymeric MDI is an MDI product including oligomeric species in addition to MDI isomers. Thus, polymeric MDI contains a single MDI isomer or isomer mixtures of two or three MDI isomers, the balance being oligomeric species. Polymeric MDI tends to have isocyanate functionalities of higher than 2. The isomeric ratio as well as the amount of oligomeric species can vary in wide ranges in these products. For instance, polymeric MDI may typically contain about 30 to 80% by weight of MDI isomers, the balance being said oligomeric species. As in the case of monomeric MDI, the MDI isomers are often a mixture of 4,4'-MDI, 2,4'-MDI and very low levels of 2,2'-MDI. Polymeric MDI is typically a brown or dark amber liquid product at room temperature (23° C.).

Surprisingly, higher average NCO functionality leads to glossier products when used according to the present invention. For the present invention, a NCO functionality of 2.5 or higher, preferably 2.7 or higher, is preferred. However, improved gloss effect can also be achieved with a lower average NCO functionality of at least 2, if at least one polyol P2 is added to or was present in the MDI component (B).

A wide variety of polymeric MDI grades is available with varying characteristics as to the number, type and content of isomers and oligomeric species, isomeric ratio, and weight distribution of the oligomeric homologues. These characteristics depend on type and conditions of synthesis and purification procedures. Moreover, the characteristics can be adjusted, e.g., by mixing different MDI product grades according to the needs of the customer.

MDI products including monomeric MDI and polymeric MDI are commercially available, e.g. Isonate®, Papi® and Voranate® from Dow, Lupranat® from BASF, Baytec® Enc 88 or Baytec® Enc 5003 from Bayer, or Suprasec® from Huntsman.

The MDI product may be momomeric MDI or polymeric MDI, wherein polymeric MDI is generally preferred. The total content of MDI isomers in polymeric MDI may vary. The polymeric MDI (PMDI) used may contain e.g. 55 to 65% by weight and preferably 35 to 45% by weight of MDI isomers (4,4'-MDI and optionally 2,4'-MDI and/or 2,2'-MDI), based on the total weight of the MDI product, the balance being said oligomeric species.

Apart from MDI product, component (B) may contain at least one polyurethane prepolymer which can be formed by adding at least one polyol P2, a molecule with one or more hydroxyl groups that are reactive with isocyanates, to the MDI product and leaving it react for a certain amount of time, preferably with elevated temperature. Suitable conditions include, e.g. 12 h at 40° C. The polyol is added in amounts of between 1% and 30%, preferably between 5% and 25%, more preferably between 10% and 20%, based on the total weight of component (B). This sub-stoichiometric addition leads to a partial reaction of the MDI product with the polyol, forming polyurethane-prepolymers.

Suitable polyols P2 are selected from polyhydroxy-functional polyoxyalkylene, polyhydroxy-functional polyester, polyhydroxy-functional polyoxyalkylated alcohol, or polyhydroxy-functional polyoxyalkylated natural oil.

Preferred are polyoxyalkylenepolyols, also referred to as "polyetherpolyols", polyesterpolyols, polyoxyethylenediols, polyoxyethylenetriols, polyoxypropylene-diols and polyoxypropylenetriols having an average molecular weight of from 400 to 8'000 g/mol.

Especially preferred are blends of natural polyols such as castor oil with polyoxyalkylenpolyols, blends with keton resins, mixtures thereof, and the like.

Component (B) may optionally comprise in addition to the MDI product with an average NCO functionality of 2.5 or higher, or the MDI product with an average NCO functionality of 2 or higher and one or more polyols P2, one or more additives such as catalysts in relatively small amounts, e.g. less then 4% by weight, preferably less then 1% by weight, more preferably up to 0.05% by weight of additives altogether, based on the total of component (B). It is, however, generally preferred that component (B) consists essentially of the MDI product with an average functionality of >2.5 or the reaction product of parts of the MDI product with an average functionality of >2 with the added polyol P2, the MDI being preferably monomeric MDI or polymeric MDI or mixtures thereof, if at all including only small amounts of additives, e.g. less then 1% by weight, e.g. up to 0.05% by weight of additives altogether. However, since the MDI products are technical products, they may, of course, include low quantities of impurities.

Powder Component (C)

Component (C) is a powder comprising at least one hydraulic binder, preferably cement and/or calcined paper sludge.

In a preferred embodiment, cement is used as hydraulic binder. As cement, any conventional cement type or a mixture of two or more conventional cement types may be used, for example, cements classified according to DIN EN 197-1: Portland cement (CEM I), Portland composite cement (CEM II), blast furnace cement (CEM III), pozzolanic cement (CEM IV) and composite cement (CEM V). These main types are divided into 27 subtypes, known to those skilled in the art. Of course, cements produced in accordance with another standard, such as according to ASTM Standard or Indian Standard are also suitable.

Portland cement is the most common type of cement and appropriate for the present invention. A preferred type of cement is white cement, such a white cement I-52:5. or 42.5 R. White cement is a Portland cement with a low iron oxide content. It is similar to ordinary, gray Portland cement except for its high degree of whiteness.

Another preferred embodiment uses calcined paper sludge as hydraulic binder, alone or in combination with cement or other hydraulic binders. Paper sludge is a well-known waste product of paper production and in particular a waste product formed during de-inking of recycled paper. The latter paper sludge is also called deinked sludge or deinked paper sludge. Paper sludge originating from the deinking process of recycled paper is preferred.

Apart from cement and/or calcined paper sludge, also other hydraulic binders, such as fly ash or slag may be used in the present invention.

Component (C) preferably further comprises a calcium compound selected from calcium hydroxide and/or calcium oxide. Calcium hydroxide is also known as hydrated lime, calcium oxide is also known as burnt lime. Calcium hydroxide and calcium oxide can each be purchased as a white powder. The calcium compound selected from calcium hydroxide and/or calcium oxide may play an important role in the composition by controlling workability and by avoiding blister formation. It is generally preferred to use either calcium hydroxide or calcium oxide, but a mixture of calcium hydroxide and calcium oxide can also be used.

In addition, component (C) comprises in preferred embodiments one or more aggregates. Aggregates are chemically inert, solid particulate materials. Aggregates come in various shapes, sizes, and materials ranging from fine particles of sand to large, coarse rocks. Examples of suitable aggregates are sand, such as silica sand, gravel, and crushed stone, slag, calcined flint, lightweight aggregates as clay, bentonite, pumice, perlite, and vermiculite. Sand, in particular silica sand, is preferably used to reach the workability expected and to obtain a smooth surface.

The grain size of the aggregates is preferably rather small, e.g. less than 2 mm The aggregate may have, for instance, a grain size in the range of 0.06 to 2 mm, wherein sand, in particular silica sand, having a grain size in the range of 0.1 to 1 mm is particularly preferred. For instance, sand having a grain size ranging from 0.3 to 0.8 mm or from 0.1 to 0.5 mm can be advantageously used in the present invention. The grain size range can be determined, e.g. by sieve analysis.

The use of aggregates depends largely on the desired application. Especially for highly self-levelling products or very thin coating applications, omitting aggregates completely may be advantageous. The skilled artisan is able to adjust the type and amount of aggregates to the desired workability properties and end-use of the product.

Component (C) may optionally comprise one or more additives which are commonly used, if desired, and typically known to the persons skilled in the art of cement applications. Examples of suitable additives, which may be optionally used in component (C), are superplasticizers such as polycarboxylate ethers (PCE); mineral oil, fibres such as cellulose fibres, and inorganic or organic pigments.

2-(Dimethylamino)ethanol

The composition contains 2-(Dimethylamino)ethanol (DMEA), whereby the molar ratio of the 2-(Dimethylamino) ethanol to the OH-groups of the polyol P1a is between 0.0008 and 0.013, preferably 0.0042 and 0.013, most preferably 0.0084 and 0.011. 2-(Dimethylamino)ethanol is, for example, commercially available from Sigma-Aldrich (Switzerland).

It was surprisingly found that outside of the inventive ratio of 0.0008 and 0.013 the compositions either display a too long or too short open time, as seen for example in the experiments of table 1.

Tertiary Amine tAM

Preferably, the composition further contains at least one tertiary amine tAM of the formula

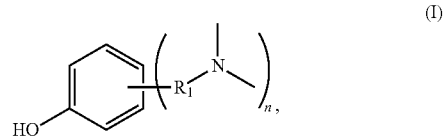

(I)

$R_1$ is an alkylene group having 1 to 20 carbon atoms, which is optionally substituted, and n has a value of 1 to 3. The molar ratio of the tertiary amine tAM to the OH-groups of the polyol Pia is between 0.0003 and 0.0042, preferably between 0.0014 and 0.0042, most preferably between 0.0028 and 0.0037, and the molar ratio of the 2-(Dimethylamino)ethanol to the OH-groups of the polyol P1a is between 0.0008 and 0.0042, preferably 0.0008 and 0.0025, most preferably 0.0008 and 0.0017.

Preferably $R_1$ is $CH_2$ or $—CH_2—NH—C_3H_6$ and n is 1-3, in particular 3.

It is especially preferred if the tertiary amine tAM is selected from the group consisting of 2-(dimethylaminomethyl) phenol, 2,6-bis (dimethylaminomethyl) phenol, 2,4-bis (dimethylaminomethyl) phenol, 2,4,6-tris (dimethylaminomethyl) phenol and 2,4,6-tris (((3-(dimethylamino) propyl) amino) methyl) phenol.

Most preferred is the tertiary amine tAM selected from the group consisting of 2,4,6-tris (((3-(dimethylamino) propyl) amino) methyl) phenol and 2,4,6-tris (dimethylaminomethyl) phenol, preferably 2,4,6-tris (dimethylaminomethyl) phenol. 2,4,6-Tris (dimethylaminomethyl) phenol is, for example, commercially available as Ancamine K54® from Air Products GmbH (Germany).

It was surprisingly found that such compositions containing a tertiary amine tAM mentioned before display superior properties with respect to Workability at 12° C. and can be particularly well applied on the substrate after mixing, as seen for example in the experiments of table 3.

Preferably, it is advantageous if such compositions containing a tertiary amine tAM mentioned advantageous have a weight ratio of components (A+B) to component (C) ((A+B)/(C)) that is in the range of 2:2.5 to 2:3.5, wherein components (A+B) represents the combined weight of component (A) and component (B). Such compositions are especially suited to be used as scratch coat, preferably in a thickness of 1-2 mm, since they display superior properties with respect to Workability at 12° C. as well as at 25° C. and can be particularly well applied on the substrate after mixing. Further, such compositions show very good performances with respect to reduction of blister formation. This can be seen for example in the experiments of table 3.

Such compositions were found to be particularly well distributed by using for example tooth-blade.

Suitable Proportions for the Three Component Composition

The weight ratio of components (A+B) to component (C) ((A+B)/(C)) is in the range of 2:1.5 to 2:3.5, wherein components (A+B) represents the combined weight of component (A) and component (B).

It was surprisingly found that outside of the inventive range of 2:1.5 to 2:3.5 the cured compositions showed blister formation, as seen for example in the experiments of table 2.

It may be advantageous if the weight ratio of components (A+B) to component (C) ((A+B)/(C)) is in the range of 2:2.5 to 2:3.5, wherein components (A+B) represents the combined weight of component (A) and component (B). Such compositions are especially suited to be used as scratch coat, preferably in a thickness of 1-2 mm, since they display superior properties with respect to Workability at 12° C. as well as at 25° C. and can be particularly well applied on the substrate after mixing, as seen for example in the experiments of table 3. Such compositions were found to be particularly well distributed by using for example a toothblade.

It may be also advantageous if the weight ratio of components (A+B) to component (C) ((A+B)/(C)) is in the range of 2:1.5 to 2:2.5, wherein components (A+B) represents the combined weight of component (A) and component (B). Especially if the composition further contains at least one tertiary amine tAM of the formula (I) and the amount mentioned before as well as the molar ratio of the 2-(Dimethylamino)ethanol to the OH-groups of the polyol P1a is in the range mentioned before. Such compositions are especially suited to be used as primer, preferably in a thickness of 0.4-1 mm, since they display superior properties with respect to Workability at 25° C. and shows very good performances with respect to reduction of blister formation, as seen for example in the experiments of table 3. Such compositions were found to be particularly well distributed by using for example a rubber wiper followed by a paint roller.

It may be also advantageous if the weight ratio of components (A+B) to component (C) ((A+B)/(C)) is in the range of 2:2 to 2:2.5, wherein components (A+B) represents the combined weight of component (A) and component (B). Especially if the composition further contains at least one tertiary amine tAM of the formula (I) and the amount mentioned before as well as the molar ratio of the 2-(Dimethylamino)ethanol to the OH-groups of the polyol P1a is in the range mentioned before. Such compositions exhibit similar cure times and open times independent of temperature and humidity, preferably at a curing temperature from 5° C. to 35° C., preferably from 10° C. to 30° C., and at a relative humidity from 20% to 80%.

By further adjusting the proportions of the ingredients within the components and between the components as well in a suitable manner, the improvements of the present invention can be significantly enhanced. Such suitable proportions are described in the following. The ingredients indicated refer to the ingredients in the particular component as discussed above. Ratios referring to ingredients in different components relate to suitable or correct proportions of each component according to operating instructions, i.e. to the mixing ratios to be used for mixing the three components and, in use to the mixture of the three components prepared.

The three component composition of the invention is in one preferred embodiment containing aggregates formulated such that the following proportions are satisfied:
a) the content of water is in the range of 3.5 to 5% by weight, preferably in the range of 4.1 to 4.6% by weight,
b) the content of MDI product is in the range of 15 to 18% by weight, preferably in the range of 16 to 17% by weight, and
c) the content of hydraulic binder is in the range of 16 to 20% by weight, preferably in the range of 17 to 18% by weight, based on the total weight of component (A), component (B) and component (C).

In another preferred embodiment not containing aggregates such as sand, the three component composition of the invention is formulated such that the following proportions are satisfied:
a) the content of water is in the range of 5 to 15% by weight, preferably in the range of 9 to 11% by weight,
b) the content of MDI product is in the range of 30 to 50% by weight, preferably in the range of 35 to 45% by weight, and
c) the content of hydraulic binder is in the range of 25 to 45% by weight, preferably in the range of 30 to 40% by weight, based on the total weight of component (A), component (B) and component (C).

Differences in the amount of water can influence not only the finished surface of the product but also the physical properties such as compression strength, workability and open time. Therefore, the proportion of water with respect to the other ingredients is to be determined carefully.

In the powder component, the calcium compound selected from calcium hydroxide (hydrated lime) and/or calcium oxide can play an important role, depending on the application. The content of the calcium compound selected from calcium hydroxide and/or calcium oxide may be, e.g., in the range of 1 to 4% by weight, preferably in the range of 3 to 3.5% by weight, based on the total weight of component (A), component (B) and component (C).

Moreover, the three component composition of the invention is preferably formulated such that at least one, preferably all, of the following weight ratios is satisfied:
a) the weight ratio of water to MDI product is in the range of 0.2 to 0.3 preferably in the range of 0.24 to 0.26,
b) the weight ratio of water to cement is in the range of 0.2 to 0.3, preferably in the range of 0.21 to 0.27, and/or
c) the weight ratio of hydraulic binder to MDI product is in the range of 0.8 to 1.6, preferably in the range of 0.9 to 1.4.

The weight ratio of water to the calcium compound selected from calcium hydroxide and/or calcium oxide in the three component composition is e.g. generally in the range of 1 to 4.5 and preferably in the range of 1.2 to 3.

The molar ratio of polyol hydroxyl groups in component (A) to MDI isocyanate groups in component (B) is preferably in the range of from 0.1 to 0.4. Said molar ratio further improves compressive strength of the finished product. The molar ratio can easily be determined via the equivalent weights of the polyols and polyisocyanates used.

Component (A) is preferably formulated such that the water content is in the range of 20 to 40% by weight, preferably 22 to 35% by weight, and in particular 24 to 30% by weight, and/or the content of polyol P1a is in the range of 20 to 75% by weight, preferably 25 to 70% by weight, more preferably 30 to 60% by weight, most preferably 35 to 50% by weight, the content of polyol P1b is in the range of 1 to 25% by weight, preferably 2 to 20% by weight, more preferably 3 to 15% by weight, most preferably 3 to 10% by weight, each based on the total weight of component (A).

In one preferred embodiment, component (C) is formulated such that at least one, preferably all, of the following conditions is fulfilled, each based on the total weight of component (C):
a) the cement content is in the range of 20 to 40% by weight, preferably 25 to 40% by weight, b) the content of calcium compound selected from calcium hydroxide and/or calcium oxide is in the range of 1 to 6% by weight, preferably 2 to 6% by weight, more preferably 4.5 to 5.5% by weight, c) the aggregates content, preferably sand, is in the range of 55 to 80% by weight, preferably 55 to 65% by weight.

In preferred embodiments, both component (A) and component (C) are formulated according to the proportions outlined above. Moreover, it is preferred that component (B) either consists essentially of the MDI product with average functionality of at least 2.5, or of a reaction product of the MDI product with average functionality of at least 2 and polyol P2, whereby it is most preferred that component (B) consists essentially of the MDI product with average functionality of at least 2.5.

As to the mixing ratio of components (A), (B) and (C), the weight ratio of component (A) to component (B) is preferably in the range of 0.7 to 1.4, and more preferably in the range of 0.9 to 1.2.

Method for the Manufacture of a Polyurethane Cementitious Hybrid Primer or Scratch Coat The three component composition of the invention is suitable to prepare a polyurethane cementitious hybrid primer or scratch coat. The method comprises a) mixing polyol component (A) and polyisocyanate component (B), b) adding the powder component (C) to the mixture of polyol component (A) and polyisocyanate component (B) and mixing, to obtain a mixed material, c) applying the mixed material to a substrate, d) optionally smoothing the applied mixed material, and e) curing the applied mixed material, to obtain the polyurethane cementitious hybrid primer or scratch coat.

A typical layer thickness for a primer layer ranges from 0.4-1 mm, preferably 0.4-0.8 mm. A typical layer thickness for a scratch coat layer ranges from 1-2 mm, preferably 1-1.5 mm. The application temperature is preferably from about 5 to 35° C., especially preferred between 10-25° C.

Another aspect of the present invention is the use of a three component composition as described herein as a primer or scratch coat, preferably directly on a concrete surface, further preferably as a primer or with a thickness of 0.4-1 mm or a scratch coat with a thickness of 1-2 mm. The cured composition is preferably obtained by curing the composition at a curing temperature from 5° C. to 35° C., preferably from 10° C. to 30° C., and at a relative humidity from 20% to 80%.

A further aspect of the present invention is the use of 2-(Dimethylamino)ethanol as described in detail further above, in a three component composition according as described before, preferably as a primer or scratch coat, to obtain an open time between 15 min and 5 hours at temperatures between 5 and 35° C. at 50% relative humidity, whereby the open time is measured by having applied the freshly mixed three component composition in films of 3 mm thickness and pulling a spatula with a thickness of 2 mm (immersion depth 2 mm) through the film, whereby the end of the open time is reached the composition does not close the remaining mark anymore and the measurement of the open time starts after mixing of the material.

The invention is further explained in the following experimental part which, however shall not be construed as limiting the scope of the invention. The proportions and percentage indicated are by weight, unless otherwise stated.

EXAMPLES

Composition C-1

The composition C-1 is a three-component polyurethane cementitious hybrid flooring composition. The composition of component (A), component (B) and component (C) are shown below.

The ingredients indicated below were mixed to form component (A), component (B) or component (C) respectively. The amounts given are in parts by mass.

| Ingredient | Weight % based on weight of component (A) |
|---|---|
| Component (A) | |
| Castor oil LV-117 (polyol P1a), Mw. = 1000 g/mol, OH-number 155 mg KOH/g | 40 |
| Ethylene glycol (polyol P1b) | 5 |
| Citrofol BII (plasticizer) | 17 |
| Tego Airex 944 (defoamer) | 1 |
| DMEA (amine catalyst), Mw = 89.14 g/mol | as indicated |
| K54 (amine catalyst), 265.39 g/mol | as indicated |
| Bayferrox (pigment) | 10 |
| Water | 27 |

| Ingredient | Weight % based on weight of component (B) |
|---|---|
| Component (B) | |
| Desmodur VKS 20 (MDI product with a functionality of 2.7), Bayer Material Science | 100 |

| Ingredient | Weight % based on weight of component (C) |
|---|---|
| Component (C) | |
| Silica sand 0.1-0.5 mm | 74 |
| White cement CEM 1 52.5N | 25 |
| Calcium hydroxide (hydrated lime) | 1 |

Composition Mixture

Components (A), (B) and (C) are mixed in a weight ratio to obtain a mixture as indicated below, e.g. a weight ratio of 1(A), 1(B) and 2(A), respectively ((A+B)/(C))=2:2, was used.

Unless indicated otherwise 1 kg of total material (sum of (A), (B) and (C) component) was mixed for 3 min at 900 rpm.

Measurement of Open Time

The open time of various compositions based on composition C-1 were tested. Components (A), (B) and (C) were mixed in a weight ratio of 1(A), 1(B) and 2(A), respectively ((A+B)/(C))=2:2. For various concentrations of DMEA indicated "DMEA only", respectively Ancamine K54 indicated "K54 only", the open time was determined. "Catalyst (wt-%)" indicates the amount of DMEA, respectively Ancamine K54, in weight-%, based on the total weight of the (A) component. "DMEA/OH-groups" determines the molar ratio of the DMEA (2-(Dimethylamino)ethanol, Sigma-Aldrich) to the OH-groups of the polyol P1a, respectively "K54/OH-groups" determines the molar ratio of the 2,4,6-Tris (dimethylaminomethyl) phenol to the OH-groups of the polyol P1a.

The open time was measured as described below. For example, the composition C-1 containing 2 wt-% DMEA based on the total weight of the (A) component displayed a very short open time of only 5 min. Further the cured sample showed blister formation. It was found that compositions containing more or less than the inventive range from 0.0008 to 0.013 either show a too short open time of less than 15 min or a too long open time of more than 5 hours.

bination with DMEA either lead to a too short open time or in case of Jeffcat Z-130 to a very poor workability due to a very high viscosity.

Other catalysts in combination with DMEA (Coscat 83 and Dabco 33) were found to have no impact on the open time at all.

TABLE 1

| Catalyst (wt-%) | DMEA only | DMEA/OH-groups | K54 only | K54/OH-groups | K54 + DMEA* | Jeffcat Z-130 + DMEA* | Metatin 813 + DMEA* | Coscat 83 + DMEA* | Dabco 33 LV + DMEA* |
|---|---|---|---|---|---|---|---|---|---|
| 2 | 5 min, Blister | 0.1683 | n.d. | 0.0565 | <5 min, Blister | n.d. | n.d. | n.d. | n.d. |
| 0.4 | 8 min, Blister | 0.0337 | n.d. | 0.0113 | 8 min, Blister | <1 min, Blister | n.d. | n.d. | 5 hours |
| 0.2 | 12 min | 0.0168 | >6.5 hours | 0.0057 | 12 min | <8 min, Blister | <1 min, | 5 hours | 5 hours |
| 0.1 | 16 min, all open times | 0.0084 | >6.5 hours | 0.0028 | 16 min | 14 min, Workability poor | <1 min, | 5 hours | n.d. |
| 0.01 | 5 hours | 0.0008 | >6.5 hours | 0.0003 | 5 hours | n.d. | n.d. | n.d. | n.d. |
| 0.005 | >6.5 hours | 0.0004 | n.d. | 0.0001 | >6.5 hours | n.d. | n.d. | n.d. | n.d. | determination of the open time (measured as described before) and further observations, weight ratio of the components (A):(B):(C) = 1:1:2, cured = immediate cure hence no open time, n.d. = not determined, * = composition C-1 containing 0.015 wt-% DMEA based on the total weight of the (A) component.

The open time was determined after having applied the freshly mixed material in films of 3 mm thickness (at 23° C./50% relative humidity) by pulling a spatula with a thickness of 2 mm (immersion depth 2 mm) through the film. When the composition does not close the remaining mark any more, the end of the open time is reached. The measurement of the open time starts after mixing of the material.

The cure time was determined after having applied the freshly mixed material in films of 3 mm thickness (at 23° C./50% relative humidity) by touching the surface with a cosmetic cotton pad. When no cotton fibres stick to the surface any more, the end of the cure time is reached. The measurement of the cure time starts after mixing of the material.

In order to improve the qualities of the inventive compositions, especially with respect to the aspect of applicability (further indicated in the experiments below), other catalysts in combination with DMEA were tested for improvement of the applicability properties. The following catalysts were tested in combination with DMEA:

| K54 | Ancamine K54, 2,4,6-Tris (dimethylaminomethyl) phenol is, Air Products GmbH |
|---|---|
| Jeffcat Z-130 | Jeffcat Z-130, N'-(3-(dimethylamino)propyl)-N,N-dimethyl-1,3-propanediamine, Huntsman |
| Metatin 813 | Metatin 813, Dioctyltin catalyst, Dow |
| Coscat 83 | Coscat 83, organobismuth catalyst, Vertellus |
| Dabco 33 | Dabco 33 LV, 1,4-Diazabicyclo[2.2.2]octane, Sigma-Aldrich |

The above catalysts were tested in composition C-1 containing 0.015 wt-% DMEA based on the total weight of the (A) component. Surprisingly it was found that only Ancamine K54 was able to produce a very similar catalytic activity with respect to the open time as DMEA. Further, it was surprising that the catalytic activity of Ancamine K54 was dependent on the co-presence of DMEA since composition C-1 containing only Ancamine K54 did not affect the open time ("K54 only"). The other tested catalysts in com- Blister Formation, Comparison of Weight Ratio of Components (A), (B) and (C The curing behavior, especially the formation of blisters, of various compositions based on composition C-1, was tested. The tested compositions all contained 0.015 wt-% DMEA and 0.125 wt-% Ancamine K54, both based on the total weight of the (A) component. The weight ratio of component (A) to component (B) was always kept constant at 1:1 whereas the amount of component (C) was varied. The compositions were mixed and immediately poured onto a concrete substrate to form a layer of 1.5 mm thickness. After cure the layer was visually inspected for blister formation.

It was found that compositions outside of the inventive range ((A+B)/(C)) from 2:1.5 to 2:3.5 showed blister formation after curing.

TABLE 2

| weight ratio of ((A + B)/(C)) | Blister formation |
|---|---|
| 2:1 | yes |
| 2:1.5 | no |
| 2:2 | no |
| 2:3 | no |
| 2:3.5 | no |
| 2:4 | yes |

Test for Applicability

The applicability of the compositions was tested on a concrete surface. The compositions were based on composition C-1 containing either:

–0.1 wt-% DMEA only for E-1, 0.125 wt-% DMEA only for E-3 respectively, based on the total weight of the (A) component, or based on composition C-1 containing –0.015 wt-% DMEA and 0.1 wt-% Ancamine K54 for E-2, 0.015 wt-% DMEA and 0.125 wt-% Ancamine K54 for E-4 respectively, based on the total weight of the (A) component.

For the compositions E-1 and E-2 the weight ratio of component (A) to component (B) to component (C) was 1:1:2 whereas for the compositions E-3 and E-4 the weight ratio was 1:1:3.

10 kg of the indicated compositions (E-1 to E-4) was mixed for 3 min at 900 rpm and the material applied on the cured concrete substrate. The applied material was either distributed with a rubber wiper followed by a paint roller (primer, E-1 and E-2) or with a tooth-blade (scratch coat, E-3 and E-4).

The processability of the compositions was determined by the processor/applicator during the application. The processability of similar primer or scratch coat systems on the market and their application properties served as a reference.

The ease of pouring the composition out of the mixing container onto the substrate was measured as "Viscosity". The "Workability at 25° C." and "Workability at 12° C." indicate with which resistance the coating can be distributed at either 25° C. or 12° C. ambient temperature. For the experiments "primer" the aim of the application was to apply a 0.8 mm thick layer with a reasonable amount of force and in a reasonable time with a rubber wiper followed by a paint roller.

For the experiments "scratch coat" the aim of the application was to apply a 1.25 mm thick layer with a reasonable amount of force and in a reasonable time with a tooth-blade/spatula/scraper.

After curing, the surface was inspected visually for blisters.

Accessibility/Walkability was assessed 4 hours after applying the compositions on the substrate by checking by walking on the surface and checking for imprints and for stickiness of the surface.

The following rating system was used:

TABLE 3

| Exp. | Catalyst (wt-%) | weight ratio (A):(B):(C) | | |
|---|---|---|---|---|
| E-1 | DMEA 0.1 Primer | 1:1:2 | Viscosity | ○ |
| | | | Workability at 25° C. | ○ |
| | | | Workability at 12° C. | ○/− |
| | | | Pores/blister after curing | + |
| | | | Accessibility/Walkability after 4 hours | ++ |
| E-2 | K54 0.1 Primer | 1:1:2 | Viscosity | + |
| | | | Workability at 25° C. | + |
| | | | Workability at 12° C. | ○ |
| | | | Pores/blister after curing | ++ |
| | | | Accessibility/Walkability after 4 hours | ++ |
| E-3 | DMEA 0.125 scratch coat | 1:1:3 | Viscosity | ++ |
| | | | Workability at 25° C. | ++ |
| | | | Workability at 12° C. | + |
| | | | Pores/blister after curing | + |
| | | | Accessibility/Walkability after 4 hours | ++ |
| E-4 | K54 0.125 scratch coat | 1:1:3 | Viscosity | +++ |
| | | | Workability at 25° C. | ++ |
| | | | Workability at 12° C. | ++ |
| | | | Pores/blister after curing | + |
| | | | Accessibility/Walkability after 4 hours | ++ |

○/− = just sufficient
○ = sufficient
+ = good
++ = very good
+++ = excellent

After determining the experimental values of the compositions E-1 to E-4, different commercial polyurethane cementitious hybrid self-levelling screed (Sikafloor-21 PurCem and Sikafloor-210 PurCem) were applied on top of the cured compositions E-1 to E-4. Both flooring compositions showed good adhesion to the cured compositions E-1 to E-4.

Comparison of Curing Properties at Different Ambient Temperatures

The curing properties of the compositions were tested on cured concrete substrates. The compositions were based on composition C-1 containing either:
−0.125 wt-% DMEA only, based on the total weight of the (A) component, for "DMEA only",
or based on composition C-1 containing
−0.015 wt-% DMEA and 0.125 wt-% Ancamine K54, based on the total weight of the (A) component, for "K54 and DMEA".

For both compositions the weight ratio of component (A) to component (B) to component (C) was 1:1:2.

"20% humidity", respectively "80% humidity", indicates the cure time measured as described before but at the indicated temperature and relative humidity. The open time was measured as described before but at the indicated temperature at 50% relative humidity.

TABLE 4

| Temp. | Condition | DMEA only | K54 and DMEA |
|---|---|---|---|
| 5° C. | 20% humidity | 6 | 6 |
| | 80% humidity | 5 | 5 |
| | open time | 52 | 54 |
| 10° C. | 20% humidity | 4 | 4 |
| | 80% humidity | 3 | 3 |
| | open time | 40 | 44 |
| 15° C. | 20% humidity | 4 | 4 |
| | 80% humidity | 3 | 3 |
| | open time | 36 | 30 |
| 20° C. | 20% humidity | 3 | 3 |
| | 80% humidity | 2.5 | 2.5 |
| | open time | 30 | 22 |
| 25° C. | 20% humidity | 2 | 2 |
| | 80% humidity | 1.5 | 1.5 |
| | open time | 20 | 19 |
| 30° C. | 20% humidity | 2 | 2 |
| | 80% humidity | 1 | 1 |
| | open time | 18 | 17 |

The invention claimed is:

1. A three component composition consisting of
a) a polyol component (A), the polyol component (A) being
   at least one polyol P1a with a number average molecular weight of 800 to 30,000 g/mol, whereby the polyol P1a is:
   a polyhydroxy-functional fat and/or a polyhydroxy-functional oil or
   a polyol obtained by chemical modification of natural fats and/or natural oils, and
   at least one polyol P1b with a number average molecular weight of 48 to 800 g/mol, and
   water;
b) a polyisocyanate component (B), the polyisocyanate component (B) being
   a methylene diphenyl diisocyanate (MDI) product optionally with up to 0.05% by weight of any other additives, the MDI product being either
   a polymeric MDI with an average NCO functionality of at least 2.5, or
   a mixture of monomeric MDI and polymeric MDI, the monomeric MDI and polymeric MDI being present in the mixture in amounts such that an average NCO functionality of the mixture is at least 2.5;
c) a powder component (C), the powder component (C) being at least one hydraulic binder;

wherein 2-(Dimethylamino)ethanol is present in the three component composition,
and wherein the weight ratio of components (A+B) to component (C) ((A+B)/(C)) is in the range of 2:1.5 to 2:3.5, wherein components (A+B) represents the combined weight of component (A) and component (B); and
wherein at least one tertiary amine tAM of the formula

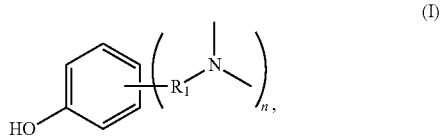

(I)

is present in the three component composition, where $R_1$ is an alkylene group having 1 to 20 carbon atoms, which is optionally substituted, and n has a value of 1 to 3, whereby the molar ratio of the tertiary amine tAM to the OH-groups of the polyol P1a is between 0.0003 and 0.0042, and the molar ratio of the 2-(Dimethylamino)ethanol to the OH-groups of the polyol P1a is between 0.0008 and 0.0042.

2. The three component composition according to claim 1, wherein, $R_1$ is $CH_2$ or —$CH_2$—NH—$C_3H_6$ and n is 1-3.

3. The three component composition according to claim 1, wherein the tertiary amine tAM is selected from the group consisting of 2-(dimethylaminomethyl) phenol, 2,6-bis (dimethylaminomethyl) phenol, 2,4-bis (dimethylaminomethyl) phenol, 2,4,6-tris (dimethylaminomethyl) phenol and 2,4,6-tris (((3-(dimethylamino) propyl) amino) methyl) phenol.

4. The three component composition according to claim 1, wherein the weight ratio of components (A+B) to component (C) ((A+B)/(C)) is in the range of 2:2.5 to 2:3.5, wherein components (A+B) represents the combined weight of component (A) and component (B).

5. The three component composition according to claim 1, wherein the weight ratio of components (A+B) to component (C) ((A+B)/(C)) is in the range of 2:1.5 to 2:2.5, wherein components (A+B) represents the combined weight of component (A) and component (B).

6. The three component composition according to claim 1, wherein said polyol P1a is present in component (A) at an amount of 20 to 75% by weight, based on the total weight of component (A), and said polyol P1b is present in component (A) at an amount of 1 to 25%, by weight, based on the total weight of component (A).

7. The three component composition according to claim 1, wherein said at least one polyol P1b of component (A) has an average OH functionality of 1.6 to 6.

8. The three component composition according to claim 1, wherein the water is present in component (A) at an amount of 20 to 40%, based on the total weight of component (A), and/or wherein the weight ratio of the water hi component (A) to polyol P1 b is in the range of 0.8 to 40, and/or wherein the weight ratio of the water in component (A) to hydraulic binder in component (C) is in the range of 0.1 to 0.7.

9. The three component composition according to claim 1, wherein the weight ratio of component (A) to component (B) is in the range of 0.7 to 1.4.

10. The three component composition according to claim 1 having an open time between 15 min and 5 hours at temperatures between 5 and 35° C. at 50% relative humidity, whereby the open time is measured by having applied a freshly mixed three component composition in films of 3 mm thickness and pulling a spatula with a thickness of 2 mm (immersion depth 2 mm) through the film, whereby the end of the open time is reached when the composition does not close a remaining mark anymore and the measurement of the open time starts after mixing of the material.

11. The three component composition according to claim 1, wherein the MDI product is the polymeric MDI and contains up to 0.05% by weight of any other additives.

12. A method for the manufacture of a polyurethane cementitious hybrid primer or scratch coat with the three component composition according to claim 1, wherein the method comprises
a) mixing polyol component (A) and polyisocyanate component (B),
b) adding the powder component (C) to the mixture of polyol component (A) and polyisocyanate component (B) and mixing, to obtain a mixed material,
c) applying the mixed material to a substrate
d) optionally smoothing the applied mixed material, and
e) curing the applied mixed material, to obtain the polyurethane cementitious hybrid primer or scratch coat.

13. A method comprising applying the three component composition according to claim 1 to a substrate as a primer or scratch coat with a thickness of 1-2 mm.

* * * * *